US010016818B2

(12) United States Patent
Gehlsen (10) Patent No.: US 10,016,818 B2
(45) Date of Patent: Jul. 10, 2018

(54) MULTI-AXIS ADJUSTMENT APPARATUS FOR MACHINING A WORKPIECE AND ASSOCIATED METHOD

(71) Applicant: The Boeing Company, Chicago, IL (US)

(72) Inventor: Paul R. Gehlsen, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 203 days.

(21) Appl. No.: 14/966,233

(22) Filed: Dec. 11, 2015

(65) Prior Publication Data

US 2017/0165762 A1 Jun. 15, 2017

(51) Int. Cl.
*B23B 39/14* (2006.01)
*B23B 49/02* (2006.01)

(52) U.S. Cl.
CPC ........... *B23B 39/14* (2013.01); *B23B 49/026* (2013.01); *B23B 2215/04* (2013.01); *B23B 2260/004* (2013.01)

(58) Field of Classification Search
CPC ... B23B 39/14; B23B 49/026; B23B 2215/04; B23B 2260/004; Y10T 408/567; Y10T 408/569; Y10T 408/5612; Y10T 408/93
See application file for complete search history.

(56) References Cited

U.S. PATENT DOCUMENTS

| 6,382,889 | B1 | 5/2002 | Brown et al. | |
|---|---|---|---|---|
| 6,808,344 | B2 * | 10/2004 | Chen | B23Q 1/5462 409/201 |
| 7,384,220 | B2 | 6/2008 | Clark | |
| 8,043,033 | B2 | 10/2011 | Clark | |

* cited by examiner

*Primary Examiner* — Daniel Howell
*Assistant Examiner* — Paul M Janeski
(74) *Attorney, Agent, or Firm* — Womble Bond Dickinson (US) LLP (57) ABSTRACT

A multi-axis adjustment apparatus configured to machine a workpiece includes a yoke member having a boring guide, which defines a boring axis and receives a boring element therethrough. The yoke member includes a spine cavity extending parallel to the boring axis. A spine member is partially disposed within the spine cavity, and a fixed member disposed under the spine member which extends along a lateral plane and defines a longitudinal axis. An orthogonal adjustment element operably engages the spine member and is configured to displace the yoke member, relative to the spine member and fixed member, along an orthogonal axis extending orthogonally from the lateral plane. A lateral adjustment element operably engages the fixed member and is configured to displace the spine member and yoke member, relative to the fixed member, along a direction parallel to the lateral plane. An associated method is also provided.

19 Claims, 9 Drawing Sheets

MULTI-AXIS ADJUSTMENT APPARATUS FOR MACHINING A WORKPIECE AND ASSOCIATED METHOD

BACKGROUND

Field of the Disclosure

The present disclosure relates generally to a tool used to machine a workpiece, and more particularly, to a multi-axis adjustment apparatus for positioning a tool with respect to the workpiece during the machining or manufacturing process.

Description of Related Art

During a machining or manufacturing process, it may be desirable to adjust the pose or orientation of the tool with respect to a workpiece in order to obtain a finished workpiece. For example, a workpiece such as an aircraft wing structure may be worked upon in a manufacturing facility by automated machines. Further, the aircraft wing structure may include a portion that requires an orifice to be drilled and/or bored therethrough. Traditional manufacturing techniques for large structures, such as aircrafts, marine equipment, and/or other heavy machines usually require fixed monument tools that are incapable of being readily adjusted to machine an orifice that extends along the desired final orientation. Additionally, the orientation of the monument tool must be monitored, analyzed, and/or updated throughout the machining process. Further, some structures and/or workpieces may not fit within the operational envelop of the monument tool. A key element to accurately machining the orifice extending in the final desired orientation is to have a tool that can be adjusted in four degrees of freedom (i.e., vertical displacement (up/down), lateral displacement (left/right), pitch and yaw). Further, the tool should be able to be rigidly attached to or in relation to the workpiece such that boring the orifice through the workpiece from a first position to a second position does not cause the tool to be displaced with respect to the workpiece in regard to the specified orientation or alignment.

SUMMARY

Example implementations of the present disclosure are directed to an improved apparatus and method for adjusting a tool relative to a workpiece during a machining process. Example implementations provide a simplified and efficient approach to adjusting the tool relative to the workpiece during a machining or manufacturing process.

Example implementations provide a multi-axis adjustment apparatus configured to machine a workpiece. The apparatus includes a yoke member that defines a boring guide. The boring guide defines a boring axis and is adapted to receive a boring element for machining the workpiece. The yoke member further includes a spine cavity that extends along the yoke member parallel to the boring axis. Additionally, the multi-axis adjustment apparatus includes a spine member that is partially disposed within the spine cavity of the yoke member. The apparatus further includes a fixed member disposed under the spine member and extending along a lateral plane. In some implementations, a fixed member may be disposed opposite the spine member from the yoke member. The fixed member defines a longitudinal axis that extends parallel to the lateral plane. Additionally, the apparatus includes an orthogonal adjustment element that is operably engaged with the spine member. The orthogonal adjustment element is configured to cooperate with the spine member to displace at least a portion of the yoke member, relative to the spine member or the fixed member, along an orthogonal axis extending orthogonally from the lateral plane. The apparatus further includes a lateral adjustment element operably engaged with the fixed member, and configured to cooperate with the fixed member to displace at least at least a portion of the spine member or the yoke member, relative to the fixed member, along a direction parallel to the lateral plane.

In some example implementations of the apparatus of the preceding or subsequent example implementations, or any combination thereof, the apparatus further includes a spine member biasing element configured to bias the spine member towards a spine cavity wall of the yoke member. The spine cavity wall defines, in part, the spine cavity.

In some example implementations of the apparatus of the preceding or subsequent example implementations, or any combination thereof, the apparatus further includes a fixed member biasing element configured to bias the spine member towards or against the fixed member.

In some example implementations of the apparatus of the preceding or subsequent example implementations, or any combination thereof, the apparatus further includes a lateral center pin. The yoke member may define a lateral center pin orifice that extends parallel to the lateral plane. In some implementations, the lateral center pin orifice extends laterally across the yoke member and into the spine cavity. The spine member may define a lateral center pin slot that extends through the spine member. In some implementations, the lateral center pin slot extends laterally across the spine member. The lateral center pin may be configured to be operably engaged between the lateral center pin orifice and the lateral center pine slot to prevent the yoke member from being displaced relative to the spine member along a direction parallel to the longitudinal axis.

In some example implementations of the apparatus of the preceding or subsequent example implementations, or any combination thereof, the apparatus further includes an orthogonal center pin. The orthogonal center pin may be partially disposed in an orthogonal center pin orifice in the fixed member that extends parallel to the orthogonal axis. The spine member may include an orthogonal center pin channel that defines a depth extending parallel to the orthogonal axis. The orthogonal center pin may be partially disposed in the orthogonal center pin channel and may be configured to prevent the spine member from being displaced relative to the fixed member along a direction parallel to the longitudinal axis.

In some example implementations of the apparatus of the preceding or subsequent example implementations, or any combination thereof, the orthogonal adjustment element configured to cooperate with the spine member to displace at least a portion of the yoke member may be further configured to pitch a portion of the yoke member relative to the spine member and the fixed member.

In some example implementations of the apparatus of the preceding or subsequent example implementations, or any combination thereof, the orthogonal center pin partially disposed in the orthogonal center pin channel of the spine member may cause the spine member to rotate relative to the fixed member about the orthogonal center pin. Additionally, the lateral adjustment element configured to cooperate with the fixed member to displace at least a portion of the spine member and yoke member may be further configured to rotate the spine member and the yoke member about the orthogonal center pin.

In some example implementations of the apparatus of the preceding or subsequent example implementations, or any combination thereof, the apparatus may further include an attachment element configured to secure the boring guide relative to the workpiece.

In some example implementations of the apparatus of the preceding or subsequent example implementations, or any combination thereof, the apparatus may further include an alignment element configured to operably engage the boring guide. The alignment element may be further configured to determine an orientation of the boring axis relative to the fixed member.

Example implementations may also provide a method for machining an orifice in a workpiece with a multi-axis adjustment apparatus. The method may include attaching a fixed member of the multi-axis adjustment apparatus relative to the workpiece. The fixed member may extend along a lateral plane and define a longitudinal axis that extends along the lateral plane. Additionally, the fixed member may include a spine member disposed thereon. The method may also include inserting a boring element through a boring guide defined by a yoke member of the multi-axis adjustment apparatus. The boring guide may define a boring axis, and the yoke member may include a yoke cavity positioned over a portion of the spine member. The method may further include inserting the boring element through the orifice in the workpiece to a first position. The orifice may define an initial orifice axis that may be parallel to the boring axis when the boring element is disposed in the first position. The method may further include positioning the boring element to a second position, wherein positioning the boring element to the second position includes displacing at least a portion of the yoke member, relative to the fixed member, along at least one of an orthogonal adjustment element operably engaged with the spine member and a direction parallel to the lateral plane with a lateral adjustment element operably engaged with the fixed member. The method may also include machining the orifice with the boring element disposed in the second position. The boring axis may be offset from the initial orifice axis when the boring element is disposed in the second position.

In some example implementations of the method of the preceding or subsequent example implementations, or any combination thereof, the method may include displacing at least a portion of the yoke member, relative to the spine member and fixed member, with an orthogonal adjustment element configured to cooperate with the spine member to displace the portion of the yoke member. The spine member may be partially disposed in a spine cavity defined by the yoke member.

In some example implementations of the method of the preceding or subsequent example implementations, or any combination thereof, the method may include displacing at least a portion of the yoke member, relative to the spine member and fixed member, with an orthogonal adjustment element operably engaged between the spine member and the yoke member.

In some example implementations of the method of the preceding or subsequent example implementations, or any combination thereof, the method may include displacing at least a portion of the yoke member, relative to the spine member and fixed member, with an orthogonal adjustment element configured to pitch the portion of the yoke member relative to the spine member and fixed member.

In some example implementations of the method of the preceding or subsequent example implementations, or any combination thereof, the method may include displacing at least a portion of the yoke member, relative to the fixed member, with an orthogonal adjustment element configured to pitch the portion of the yoke member about a lateral center pin. The yoke member may define a lateral center pin orifice that extends therethrough. The lateral center pin may be configured to operably engage the lateral center pin orifice and the lateral center pin slot to prevent the yoke member from being displaced relative to the spine member along a direction parallel to the longitudinal axis.

In some example implementations of the method of the preceding or subsequent example implementations, or any combination thereof, the method may include displacing at least a portion of the spine member and the yoke member, relative to the fixed member, with a lateral adjustment element operably engaged between the fixed member and the spine member.

In some example implementations of the method of the preceding or subsequent example implementations, or any combination thereof, the method may include displacing at least a portion of the spine member and yoke member, relative to the fixed member, with a lateral adjustment element configured to rotate the spine member and yoke member about the orthogonal axis.

In some example implementations of the method of the preceding or subsequent example implementations, or any combination thereof, the method may include displacing at least a portion of the spine member and yoke member, relative to the fixed member, with a lateral adjustment element configured to rotate the spine member and yoke member about an orthogonal center pin disposed in an orthogonal center pin orifice in the fixed member extending parallel to the orthogonal axis. The spine member may include an orthogonal center pin channel that defines a depth extending parallel to the orthogonal axis. The orthogonal center pin may be partially disposed in the orthogonal center pin orifice and the orthogonal center pin channel to prevent the spine member from being displaced, relative to the fixed member, along a direction parallel to the longitudinal axis.

Example implementations may also provide a tool configured to create an orifice in a workpiece. The tool may include a multi-axis adjustment apparatus that includes a yoke member that defines a boring guide. The boring guide may define a boring axis and may be adapted to receive a boring element for machining the workpiece. The yoke member further includes a spine cavity that extends along the yoke member parallel to the boring axis. The multi-axis adjustment apparatus further includes a spine member partially disposed within the spine cavity of the yoke member. The multi-axis adjustment apparatus further includes a fixed member disposed under the spine member and extending along a lateral plane. The fixed member may define a longitudinal axis that extends parallel to the lateral plane. Additionally, the multi-axis adjustment apparatus includes an orthogonal adjustment element operably engaged with the spine member. The orthogonal adjustment element may be configured to cooperate with the spine member to displace at least a portion of the yoke member, relative to the spine member and fixed member, along an orthogonal axis extending orthogonally from the lateral plane. The multi-axis adjustment apparatus may further include a lateral adjustment element operably engaged with the fixed member. The lateral adjustment element may be configured to cooperate with the fixed member to displace at least a portion of the spine member and yoke member, relative to the fixed member, along a direction parallel to the lateral plane. The multi-axis adjustment apparatus may further include an attachment element configured to secure the boring guide relative to the workpiece. The tool may further include a drive element operably engaged with the boring element. The drive element may be configured to rotate the boring element, within the boring guide, about the boring axis.

In some example implementations of the tool of the preceding or subsequent example implementations, or any combination thereof, the tool may include an orthogonal adjustment element configured to pitch a portion of the yoke member relative to the spine member and fixed member. Additionally, the tool may include a lateral adjustment element configured to rotate the spine member and yoke member relative to the fixed member about the orthogonal axis.

The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be expressed in many different forms and should not be construed as limited to the implementations set forth herein; rather, these exemplary implementations are provided so that this disclosure will be thorough and complete, and will fully convey the scope of the disclosure to those skilled in the art. As used herein, the term "and/or" and the "/" symbol includes any and all combinations of one or more of the associated listed items. Further, unless otherwise indicated, something being described as being a first, second or the like should not be construed to imply a particular order. It should be understood that the terms first, second, etc. may be used herein to describe various steps, calculations, positions and/or the like, these steps, calculations or positions should not be limited to these terms. These terms are only used to distinguish one operation, calculation, or position from another. For example, a first position may be termed a second position, and, similarly, a second step may be termed a first step, without departing from the scope of this disclosure. Additionally, something may be described as being above something else (unless otherwise indicated) may instead be below, and vice versa; and similarly, something described as being to the left of something else may instead be to the right, and vice versa. As used in the specification, and in the appended claims, the singular forms "a", "an", "the", include plural referents unless the context clearly dictates otherwise. Like reference numerals refer to like elements throughout.

Figure 1:
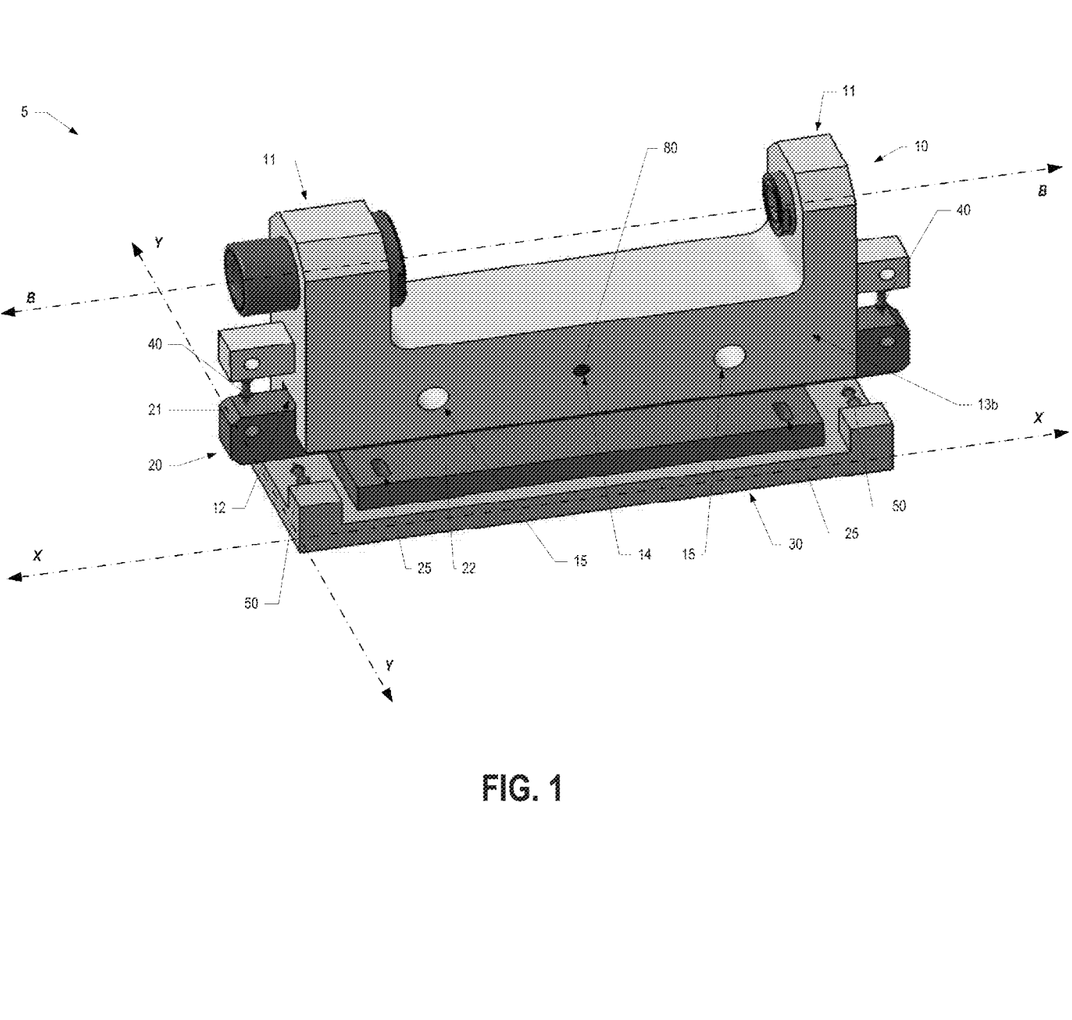
FIG. 1 illustrates a multi-axis adjustment apparatus configured to machine a workpiece oriented in a first position according to example implementations of the present disclosure.
Figure 6:
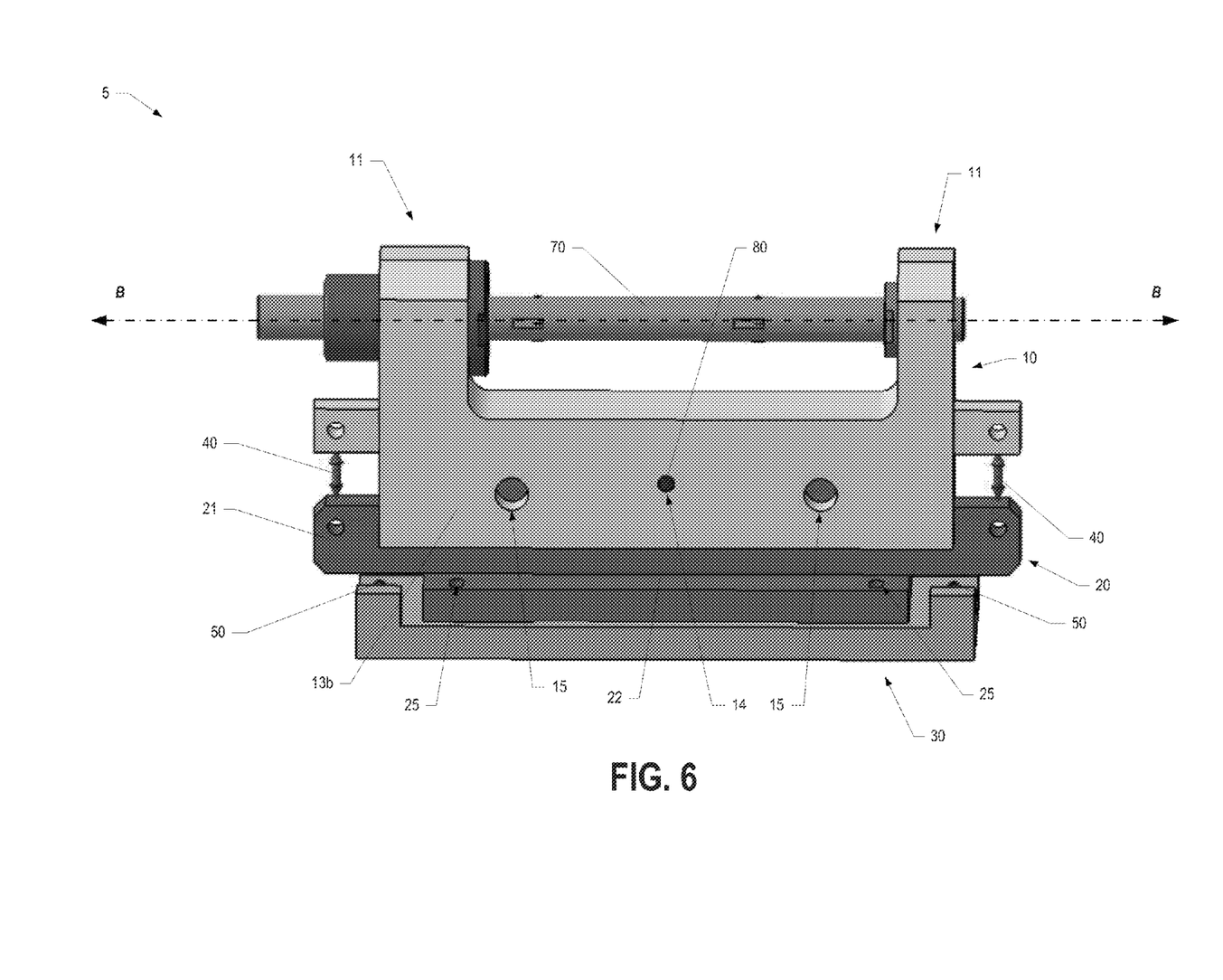
FIG. 6 illustrates a tool that includes a multi-axis adjustment apparatus configured to machine a workpiece according to example implementations of the present disclosure.

Implementations of the present disclosure provide for a multi-axis adjustment apparatus configured to machine a workpiece. As shown in FIG. 1, a multi-axis adjustment apparatus 5 includes a yoke member 10 that defines a boring guide 11. Additionally, the boring guide 11 may define a boring axis B that extends therethrough. In some aspects, the yoke member 10 may define a plurality of boring guides 11 that collectively define the boring axis B that extends through the plurality of boring guides 11. Additionally, as shown in FIG. 6, the boring guide 11 of the yoke member 10 may be adapted to receive a boring element 70, which extends along a direction parallel to the boring axis B and through the boring guide 11. According to some aspects, the boring guides 11 may include a bearing element such as, for example, a bushing, a plain bearing, and/or the like, configured to receive the boring element 70 therethrough. In particular, the bearing element may support the boring element 70 so as to allow the boring element 70 to rotate about the boring axis B during operation.

Returning to FIGS. 1 and 2, the multi-axis adjustment apparatus 5 may further include a fixed member 30 that extends along a lateral plane and defines a longitudinal axis X, which extends along a direction parallel to the lateral plane. Additionally, the fixed member 30 may define a lateral axis Y that extends along a direction parallel to the lateral plane and orthogonally from the longitudinal axis X.

Figure 2:
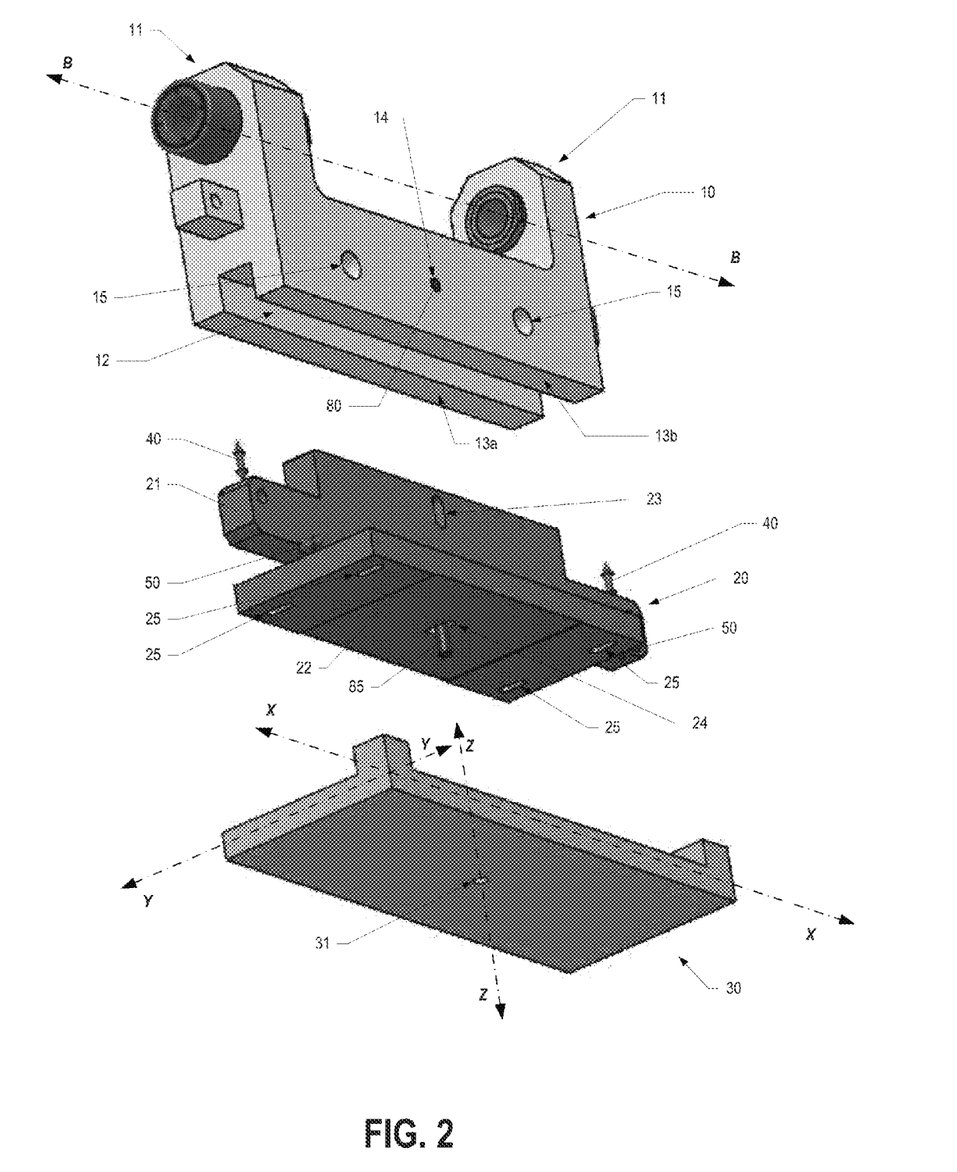
FIG. 2 illustrates an exploded view of the multi-axis adjustment apparatus illustrated in FIG. 1 according to example implementations of the present disclosure.

As shown in FIG. 2, the fixed member 30 may define an orthogonal center pin orifice 31, which extends along a direction parallel to or along an orthogonal axis Z. The orthogonal axis Z extends orthogonally from the lateral plane and may be defined by the fixed member 30. In particular, the fixed member 30 may extend along a lateral plane, and the orthogonal center pin orifice 31 may extend through the fixed member 30 and define the orthogonal axis Z.

According to some aspects, the yoke member 10 may further include a spine cavity 12 that is configured to and/or adapted to receive a spine member 20 therein, as discussed in greater detail herein. As shown in FIG. 2, the spine cavity 12 may extend along a direction parallel to the boring axis B defined by the boring guides 11. Additionally, the yoke member 10 may include opposing spine cavity walls 13a, 13b and an end wall 13c that collectively define, in part, the spine cavity 12 of the yoke member 10.

Figure 4:
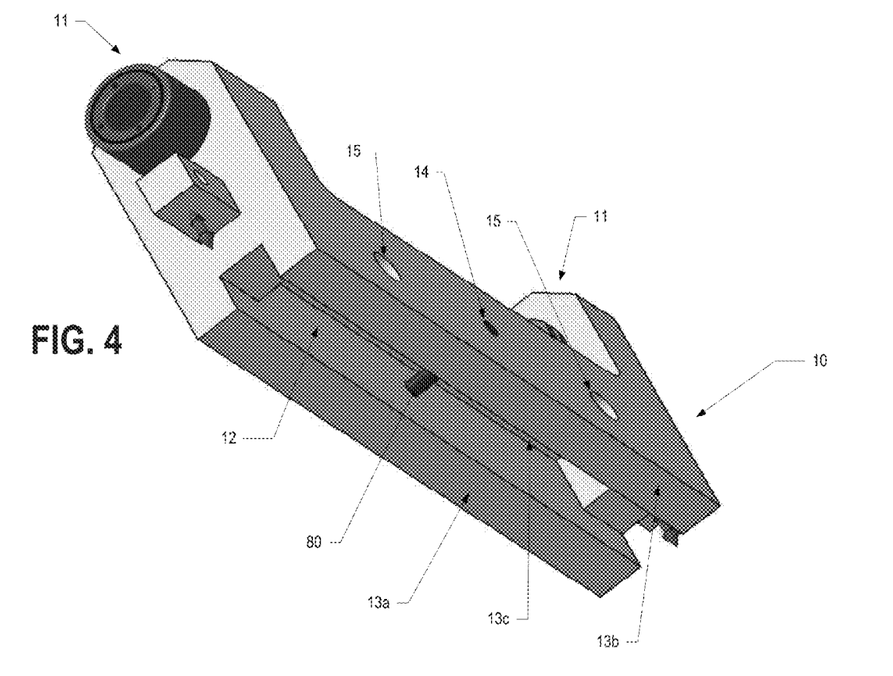
FIG. 4 illustrates a yoke member of the multi-axis adjustment apparatus according to example implementations of the present disclosure.

Additionally, the yoke member 10 may define a lateral center pin orifice 14 that extends laterally within the yoke member 10 and along a direction orthogonal to the boring axis B. In particular, the lateral center pin orifice 14 may extend through the yoke member 10 along a direction orthogonal to the boring axis B. Further, the yoke member 10 may define at least one lateral biasing orifice 15 that extends through the yoke member 10 along a direction parallel to the lateral center pin orifice 14 and/or orthogonal to the boring axis B. Additionally or alternatively, when the yoke member 10 is disposed and/or oriented in a first position, as described in greater detail herein, the lateral center pin orifice 14 and/or the lateral biasing orifice(s) 15 may extend through the yoke member 10 along a direction parallel to the lateral axis Y and orthogonal to the longitudinal axis X. As shown in FIG. 4, the lateral center pin orifice 14 may extend through a first spine cavity wall 13a of the yoke member 10 and through an opposing second spine cavity wall 13b of the yoke member 10. Alternatively, the lateral center pin orifice 14 may extend through the first spine cavity wall 13a and partially through the second spine cavity wall 13b. The lateral center pin orifices 14 may be configured to receive a lateral center pin 80 therethrough such that the lateral center pin 80 extends at least partially through the spine cavity 12.

The lateral biasing orifice 15 may extend through the first spine cavity wall 13a to the spine cavity 12. Alternatively, the lateral biasing orifice 15 may extend through the second spine cavity wall 13b to the spine cavity 12. More particularly, unlike the lateral center pin orifice 14, which extends at least through portions of both spine cavity walls 13a,13b of the yoke member 10, the lateral biasing orifice 15 may extend through only one of the spine cavity walls 13a, 13b. For example, as shown in FIG. 4, the lateral center pin orifice 14 extends through portions of both spine cavity walls 13a, 13b, while the lateral biasing orifices 15 extend through only the second spine cavity wall 13b.

As mentioned previously, the spine cavity 12 of the yoke member 10 may be configured to receive at least a portion of a spine member 20 therein. As shown in FIGS. 1 and 2, the spine member 20 includes a spine portion 21 and a base portion 22. The spine cavity 12 may be configured to receive the spine member 20 such that at least a portion of the spine portion 21 is disposed within the spine cavity 12. Additionally, as shown in FIGS. 1 and 2, the yoke member 10, the spine member 20, and the fixed member 30 of the multi-axis adjustment apparatus 5 may be arranged such that the spine member 20 is operably engaged with and disposed between the fixed member 30 and the yoke member 10.

Figure 5A:
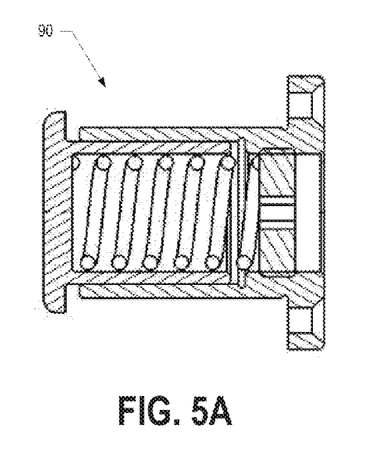
FIG. 5A illustrates a spine member biasing element according to example implementations of the present disclosure.
Figure 9:
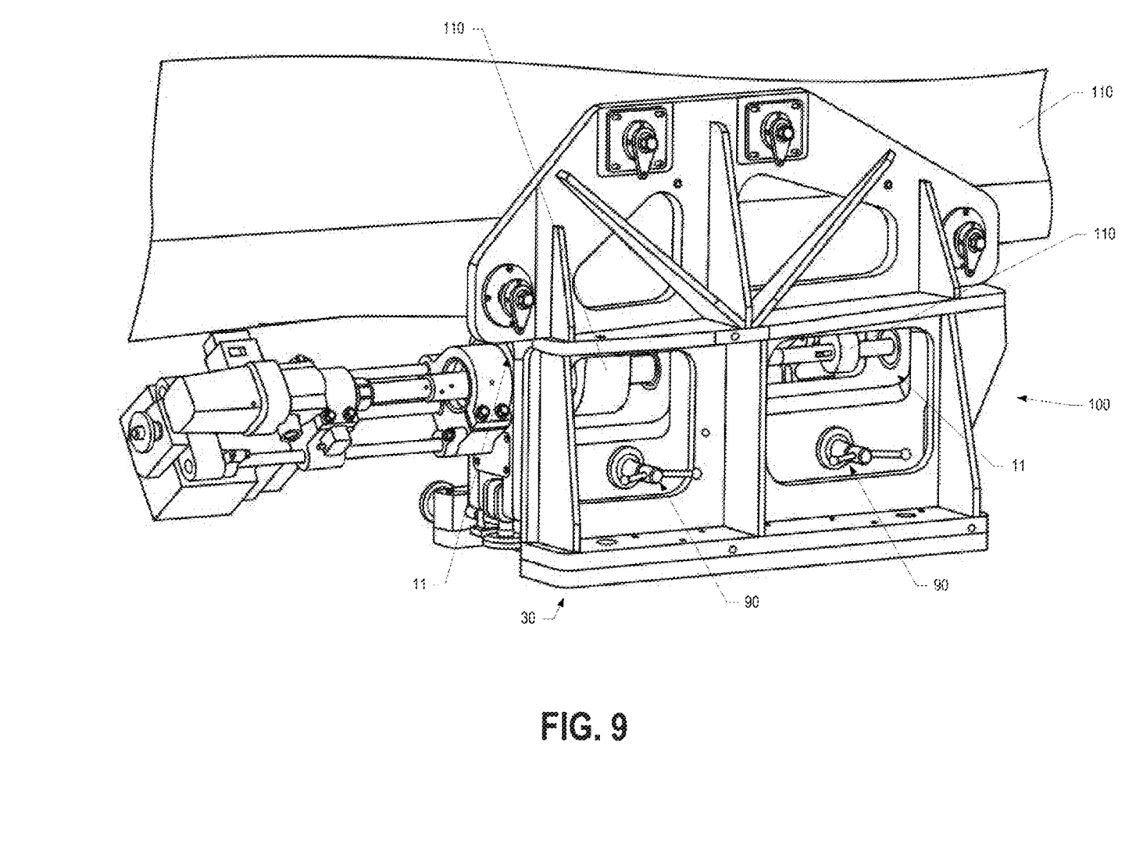
FIG. 9 illustrates the multi-axis adjustment apparatus secured to a workpiece to be machined according to example implementations of the present disclosure.

In some aspects, the multi-axis adjustment apparatus 5 may further include a spine member biasing element 90, as shown particularly in FIG. 5A. The spine member biasing element 90 may be configured to operably engage the lateral biasing orifice 15 defined by the yoke member 10, as shown in FIG. 9, to bias the spine portion 21 of the spine member 20 within the spine cavity 12 of the yoke member 10 against the opposing spine cavity wall 13a with a constant force such that the spine portion 21 substantially abuts the spine cavity wall 13a.

As shown in FIG. 2, the spine member 20 may define a lateral center pin slot 23. In particular, the lateral center pin slot 23 extends laterally through the spine portion 21 of the spine member 20 and may be disposed in correspondence with the lateral center pin orifices 14 defined by the yoke member 10 when the spine member 20 is engaged with the spine cavity 12. Additionally, the length of the lateral center pin slot 23 may extend along a direction parallel to the orthogonal axis Z, as shown in FIG. 2. The lateral center pin slot 23 of the spine member 20 and the lateral center pin orifice 14 of the yoke member 10 may be configured to receive a lateral center pin 80 therethrough upon correspondence therebetween.

As shown in FIGS. 2 and 4, the lateral center pin 80 may be configured to extend through the lateral center pin orifices 14 of the yoke member 10 and through the lateral center pin slot 23 of the spine member 20, and retained therein by a friction fit and/or the like. While the lateral center pin 80 is operably engaged with the lateral center pin orifice 14 of the yoke member 10 such that movement of the lateral center pin 80 with respect to the lateral center pin orifice 14 is restricted, the lateral center pin 80 may be operably engaged with the lateral center pin slot 23 of the spine member such that the lateral center pin 80 is free to move in a direction along the orthogonal axis Z. As the lateral center pin slot 23 extends along a direction parallel to the orthogonal axis Z, the lateral center pin orifice 14 prevents the yoke member 10 from being displaced relative to the spine member 20 along a direction parallel to the longitudinal axis X.

Returning to FIG. 2, the spine member 20 may include an orthogonal center pin channel 24 defined by the base portion 22 of the spine member 20, having a depth extending into at least a portion of the base portion 22 of the spine member along a direction parallel to the orthogonal axis Z, and a length extending along a direction parallel to the lateral axis Y. As previously mentioned, the fixed member 30 may define the orthogonal center pin orifice 31, which extends through the fixed member 30 and along a direction parallel to the orthogonal axis Z. According to some aspects, the multi-axis adjustment apparatus 5 may include an orthogonal center pin 85 that is configured to be operably engaged between the orthogonal center pin orifice 31 of the fixed member 30 and the orthogonal center pin channel 24 defined by the spine member 20.

In particular, the orthogonal center pin 85 may operably engage the orthogonal center pin orifice 31 via a friction fit and/or the like. Further, the orthogonal center pin 85 may extend through the orthogonal center pin orifice 31 of the fixed member 30, and at least a portion of the orthogonal center pin 85 may extend into the orthogonal center pin channel 24 when the fixed member 30 and the spine member 20 are operably engaged with one another. While the orthogonal center pin 90 is operably engaged with the orthogonal center pin orifice 31 of the fixed member 30 via a friction fit such that movement of the orthogonal center pin 90 with respect to the fixed member 30 is restricted, the orthogonal center pin 90 may be operably engaged with and may extend into the orthogonal center pin channel 24 of the spine member 20 such that the orthogonal center pin 85 is free to move along a direction parallel to the lateral axis Y. As the orthogonal center pin channel 24 of the spine member 20 extends along a direction parallel to the lateral axis Y and the orthogonal center pin orifice 31 is configured to operably engage the orthogonal center pin 85 in a friction fit and/or the like, operable engagement of the orthogonal center pin 85 with both the orthogonal center pin orifice 31 and the orthogonal center pin channel 24 prevents the spine member 20 from being displaced relative to the fixed member 30 along a direction parallel to the longitudinal axis X.

Figure 5B:
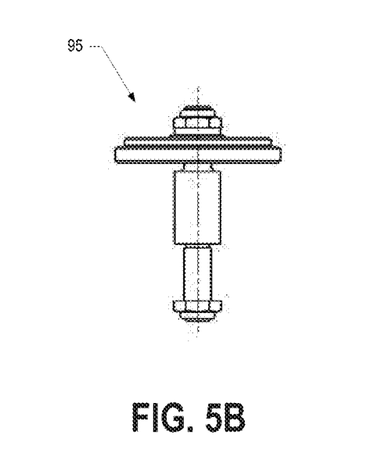
FIG. 5B illustrates a fixed member biasing element configured to operably engage at least an orthogonal biasing orifice

According to some aspects, as shown in FIG. 2, the spine member 20 may further define a plurality of orthogonal biasing slots 25 that extend through the base portion 22 of the spine member 20 and along a direction parallel to the orthogonal axis Z. In addition, the fixed member 30 may define a plurality of orthogonal biasing orifices (not shown). A fixed member biasing element 95, as shown in FIG. 5B, may be operably engaged between the orthogonal biasing slots 25 of the spine member 20 and the orthogonal biasing orifices (not shown) of the fixed member 30 to keep the fixed member 30 in tension with the spine member 20. Further, the fixed member biasing element 95 may be configured to bias the fixed member 30 and the spine member 20 towards one another to maintain a constant surface-to-surface pressure between the spine member 20 and the fixed member 30, and such that the fixed member 30 and the spine member 20 substantially abut one another.

As shown in FIG. 1, the multi-axis adjustment apparatus 5 may be disposed in a first position when the orthogonal center pin 85 is operably engaged with the orthogonal center pin channel 24, such that the orthogonal center pin 85 is disposed equidistant from the ends of the orthogonal center pin channel 24. Additionally, in the first position, the boring axis B extends along a direction parallel to the longitudinal axis X and/or along a direction orthogonal to the lateral axis Y, such as parallel to the lateral plane defined by the fixed member 30.

Additionally, the multi-axis adjustment apparatus 5 may further include at least one orthogonal adjustment element 40 operably engaged with the spine member 20, and configured to cooperate with the spine member 20 to displace at least a portion of the yoke member 10, relative to the fixed member 30, along a direction parallel to the orthogonal axis Z. In some aspects, the orthogonal adjustment element 40 may be operably engaged with the spine member 20 and the yoke member 10, and may be configured to cooperate therewith to displace at least a portion of the yoke member 10, relative to the spine member 20, along a direction parallel to the orthogonal axis Z.

Additionally, the multi-axis adjustment apparatus 5 may further include at least one lateral adjustment element 50 operably engaged with the fixed member 30, and configured to cooperate with the fixed member 30 to displace at least a portion of the spine member 20, relative to the fixed member 30, along a direction parallel to the lateral plane, or along a direction orthogonal to the orthogonal axis Z. Additionally or alternatively, the lateral adjustment element 50 may be configured to cooperate with the fixed member to displace at least a portion of the spine member 20 and the yoke member 10, relative to the fixed member 30, along a direction parallel to the lateral plane and/or along a direction orthogonal to the orthogonal axis Z.

In particular, the orthogonal adjustment element 40 may include a suitably threaded adjustment screw configured to provide fine and continuous adjustment such that a portion of the yoke member 10 is displaced along a direction parallel to the orthogonal axis Z in a continuous manner. Likewise, the lateral adjustment element 50 may include a suitably threaded adjustment screw configured to provide fine and continuous adjustment such that a portion of the yoke member 10 is displaced along a direction parallel to the lateral plane in a continuous manner. In some aspects, the orthogonal adjustment element 40 and the lateral adjustment element 50 may include a barrel nut and a clevis type pin and/or any suitable like adjustment element.

Figure 3:
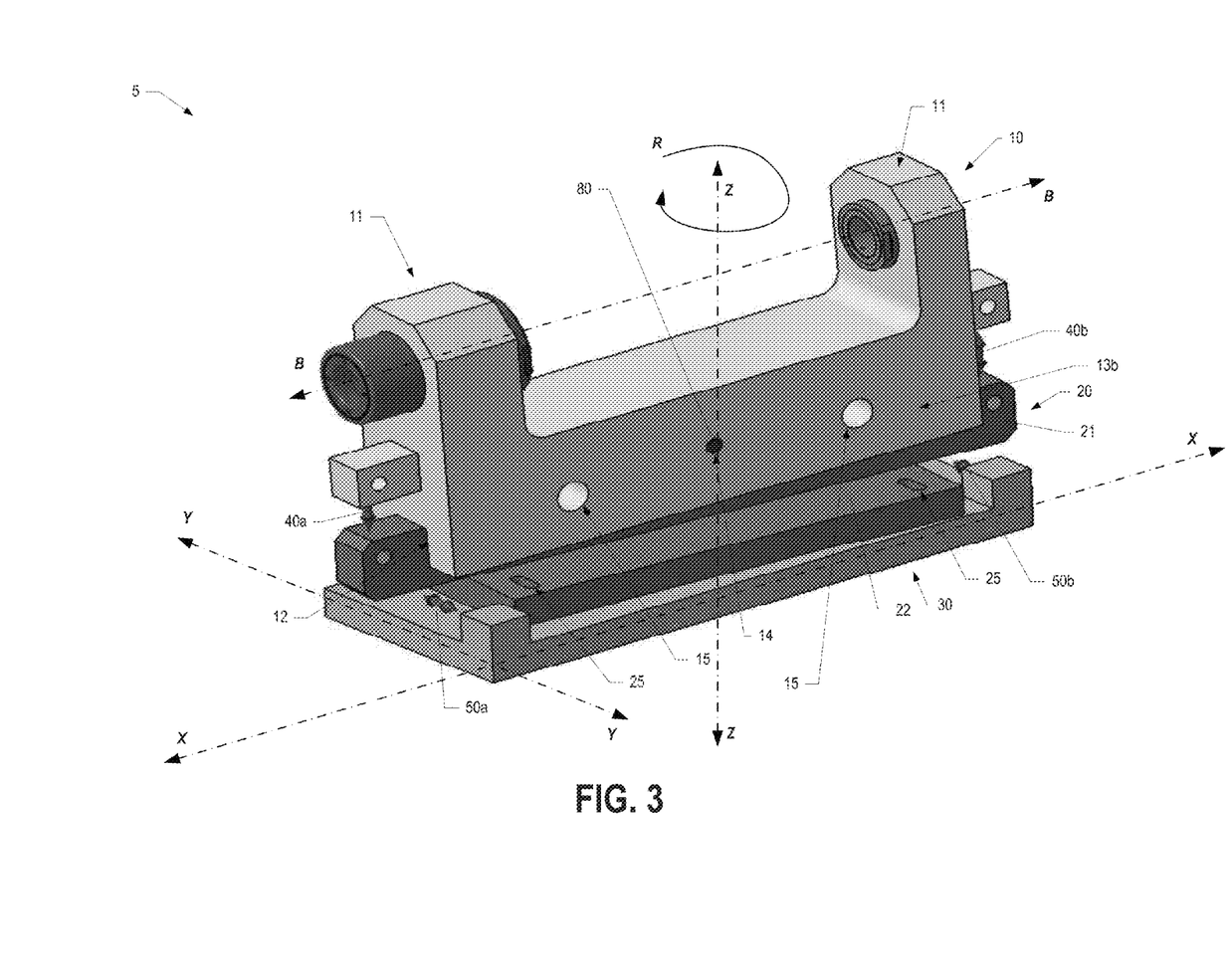
FIG. 3 illustrates a multi-axis adjustment apparatus configured to machine a workpiece adjusted from a first position to a second position along an orthogonal axis and a lateral axis according to example implementations of the present disclosure.

The orthogonal adjustment element 40 and/or the lateral adjustment element 50 may be arranged to displace at least a portion of the yoke member 10 from a first position, as shown in FIG. 1, to a second position, as shown in FIG. 3. In some implementations, the multi-axis adjustment apparatus may include a first and second orthogonal adjustment elements 40a, 40b and a first and second lateral adjustment elements 50a, 50b that may be independently adjustable with respect to any of the other orthogonal adjustment elements 40a, 40b and/or lateral adjustment elements 50a, 50b so as to displace a portion of the yoke member 10 relative to the fixed member 30.

In particular, the orthogonal adjustment element 40 may include a barrel nut and a clevis type pin adjustment element configured to displace a portion of the yoke member 10 along a direction parallel to the orthogonal axis Z in a continuous manner. For example, a barrel nut and clevis type pin adjustment element may provide for the yoke member to pitch relative to the orthogonal axis Z and/or translate along a direction parallel to the orthogonal axis Z. As shown in FIG. 3, a first orthogonal adjustment element 40a may be configured to decrease the distance between a portion of the yoke member 10 and a portion of the spine member 20, proximate to the first orthogonal adjustment element 40a, and a second orthogonal adjustment element 40b may be configured to increase the distance between a portion of the yoke member 10 and a portion of the spine member 20, proximate to the second orthogonal adjustment element 40b, such that the pitch of the yoke member 10 increases with respect to the fixed member 30.

Likewise, the lateral adjustment element 50 may include a barrel nut and clevis type pin adjustment element configured to displace a portion of the yoke member 10 along a direction parallel to the lateral plane in a continuous manner. For example, a lateral adjustment element 50 that includes a barrel nut and clevis type pin may provide for the yoke member 10 to increase and/or decrease in yaw relative to the longitudinal axis X. Additionally, the lateral adjustment element 50 that includes a barrel nut and clevis type pin may provide for the yoke member 10 to translate along a direction parallel to the lateral axis Y. That is, the yoke member 10 may be displaced along a direction parallel to the lateral axis Y in equal amounts.

According to some aspects, a first lateral adjustment element 50a may be configured to increase and/or decrease the distance between a portion of the spine member 20 and a portion of the fixed member 30, proximate to the first lateral adjustment element 50a, and a second lateral adjustment element 50b may be configured to increase and/or decrease the distance between a portion of the spine member 20 and a portion of the fixed member, proximate to the second lateral adjustment element 50b, such that the yaw of the spine member 20, relative to the fixed member 30, increases and/or decreases. In particular, FIG. 3 illustrates the first lateral adjustment element 50a increasing the distance between the spine member 20 and the fixed member 30 proximate to the first lateral adjustment element 50a and further illustrates the second lateral adjustment element 50b decreasing the distance between the spine member 20 and the fixed member 30 proximate to the second adjustment element 50b such that the yoke member 10 rotates about the orthogonal axis Z in a clockwise direction, as indicated by the arrow R. In particular, the yoke member 10 may rotate about the orthogonal axis Z in the clockwise direction and/or the counter-clockwise direction by the lateral adjustment elements 50a, 50b operably engaging the spine member 20.

In some aspects, the lateral adjustment elements 50a, 50b may be configured to displace a portion of the spine member 20, relative to the fixed member 30, along a direction parallel to the lateral axis Y. In particular, the lateral adjustment elements 50a, 50b may be adjusted in equivalent amounts to displace at least a portion of the yoke member 10 relative to the fixed member 30, via the spine member 10, along a direction parallel to the lateral axis Y.

Additionally, portions of the yoke member 10, spine member 20, and the fixed member 30 may include surfaces that provide for minimal friction when the surfaces of the yoke member 10, spine member 20, and/or fixed member 30 operably engage one another. In some aspects, the surfaces of portions of the yoke member 10, spine member 20, and the fixed member 30 may be appropriately lubricated with a suitable lubricant to minimize friction. Additionally or alternatively, the surfaces of portions of the yoke member 10, the spine member 20, and the fixed member 30 may include hard-anodized aluminum and/or the like to provide for precise sliding and minimal friction between the respective members. According to some aspects, the surfaces of portions of the yoke member 10, the spine member 20, and the fixed member 30 may include a hard-anodized aluminum and/or the like to provide for minimal galling between the respective members.

As shown in FIG. 9, the multi-axis adjustment apparatus 5 may further include an attachment element 100 configured to secure the boring guide 11 relative to the workpiece 110. In particular, the attachment element 100 may be configured to secure the fixed member 30 relative to the workpiece 110 such that the fixed member 30 remains disposed in a static position relative to the workpiece 110. With the fixed member 30 secured relative to the workpiece 110 via the attachment element 100, the spine member 20, which is operably engaged with the fixed member 30, and the yoke member 10, which is operably engaged with the fixed member 30 via the spine member 20, are secured relative to the workpiece 110.

Figure 7:
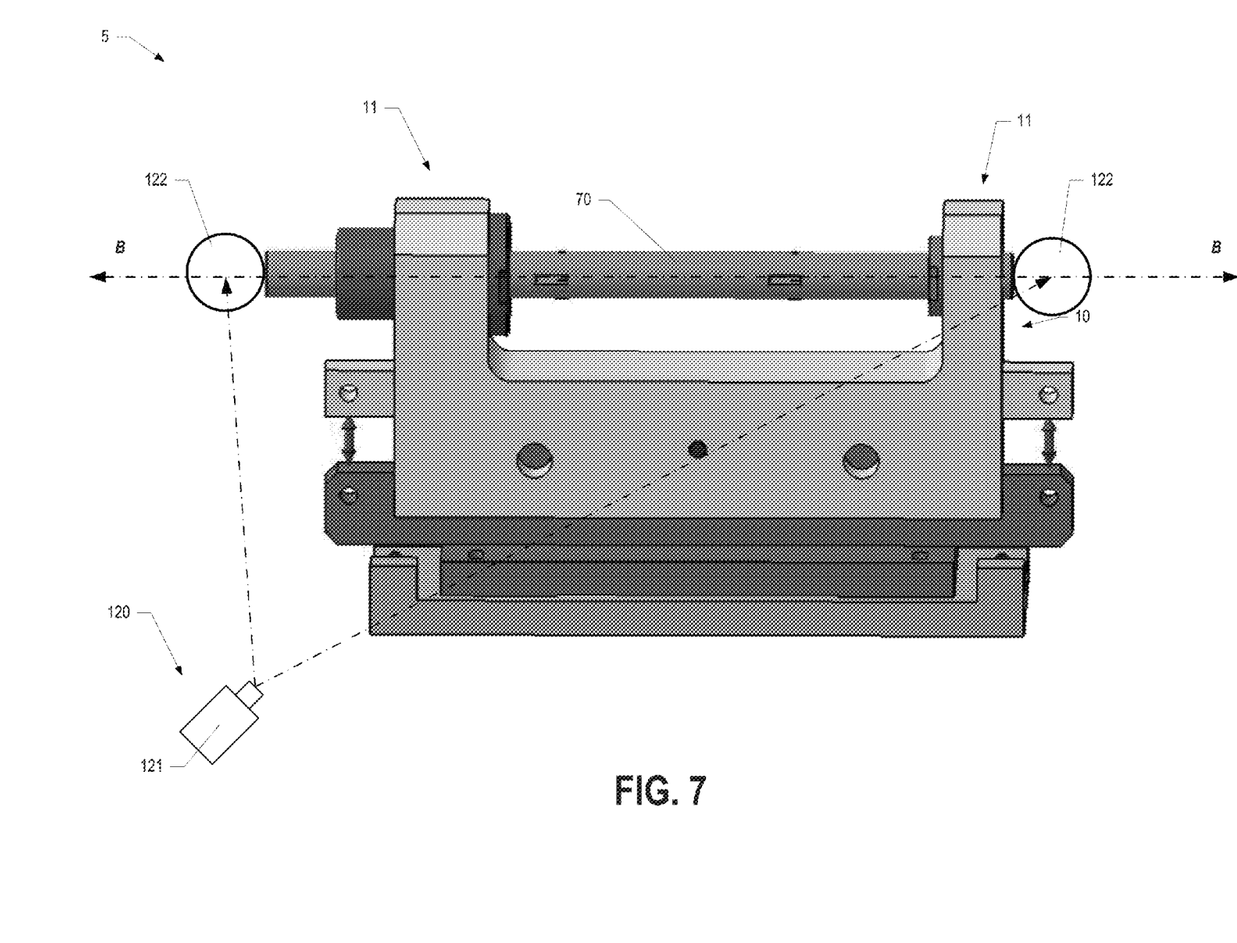
FIG. 7 illustrates a schematic diagram of the multi-axis adjustment apparatus that includes an alignment element according to example implementations of the present disclosure.

Additionally, the multi-axis adjustment apparatus 5 may further include an alignment element 120 configured to determine an orientation of the boring axis B relative to the fixed member 30. In some implementations, the alignment element or arrangement 120 may be operably engaged with the boring guide and configured to determine the orientation of the boring axis relative to the fixed member. In particular, the alignment element 120 may include at least one aligning member 121 configured to operably engage the boring element 70 extending along the boring axis. Additionally, the aligning element or arrangement 120 may include at least one imaging device 122 configured to determine the position of the aligning members 121 with respect to the fixed member 30, and therefore the orientation of the boring axis B, defined by the boring element extending therealong, with respect to the fixed member 30.

Figure 8:
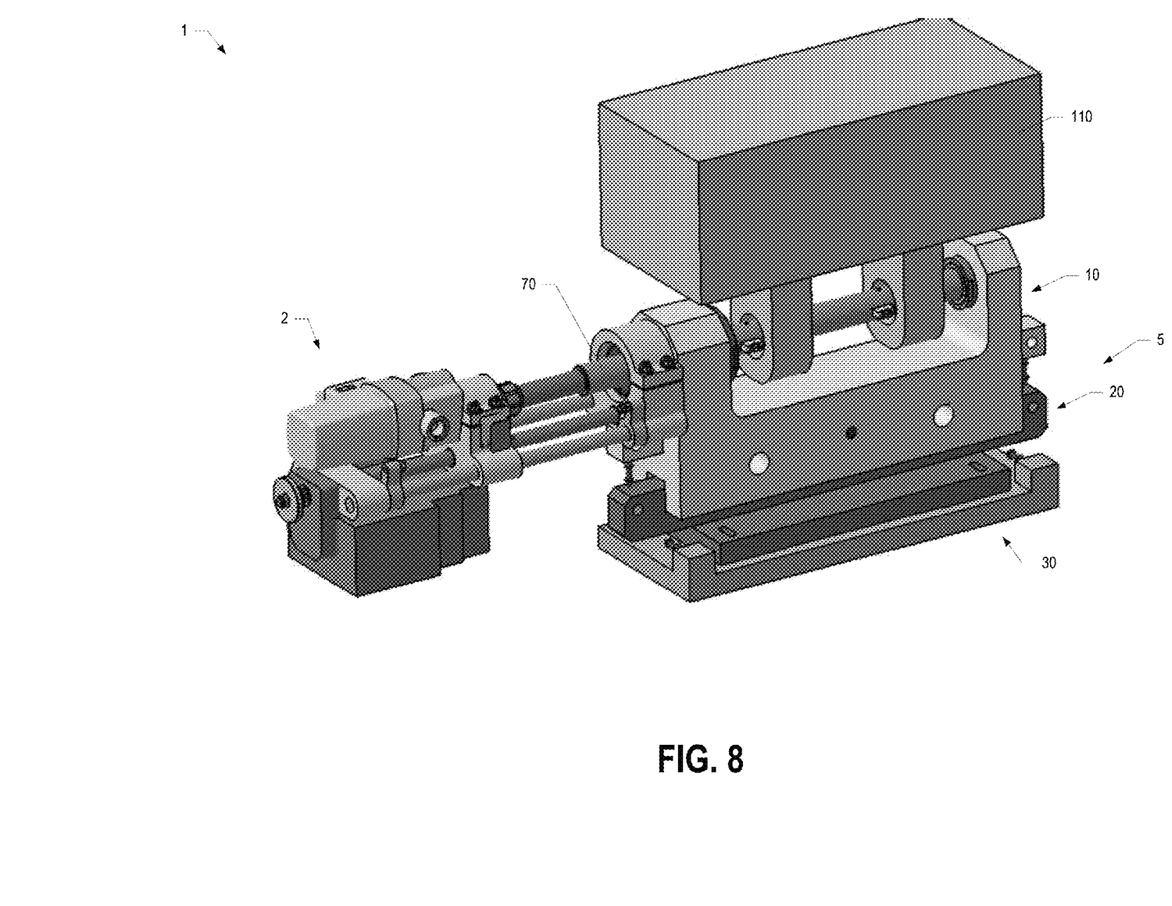
FIG. 8 illustrates a boring element extending through a boring guide defined by a yoke member of the multi-axis adjustment apparatus according to example implementations of the present disclosure.

Referring to FIG. 8, implementations of the present disclosure may also provide for a tool 1 configured to create an orifice in a workpiece 110. The tool 1 may include a multi-axis adjustment apparatus 5, as disclosed herein. In addition, the tool 1 may further include a drive element 2. The drive element 2 may include a motor and/or the like and may be configured to operably engage the boring element 70 of the multi-axis adjustment apparatus 5. In particular, the drive element 2 may be configured to rotate the boring element 70 about the boring axis B, and within the boring guides 11, so as to create an orifice in the workpiece 110.

As previously mentioned, the orthogonal adjustment element 40 of the multi-axis adjustment apparatus 5 of the tool 1 may be configured to cooperate with the spine member 20 to displace at least a portion of the yoke member 10 with respect to the fixed member 30. In particular, the orthogonal adjustment element 40 may be configured to increase and/or decrease the pitch of a portion of the yoke member 10, relative to the spine member 20 and the fixed member 30.

According to some embodiments, the lateral adjustment element 50 of the multi-axis adjustment apparatus 5 of the tool 1 may be configured to cooperate with the spine member 20 to displace at least a portion of the yoke member 10 with respect to the fixed member 30. In particular, the lateral adjustment element 50 may be configured to rotate the spine member 20 and the yoke member 10, relative to the fixed member 30, about the orthogonal axis Z.

Figure 10:
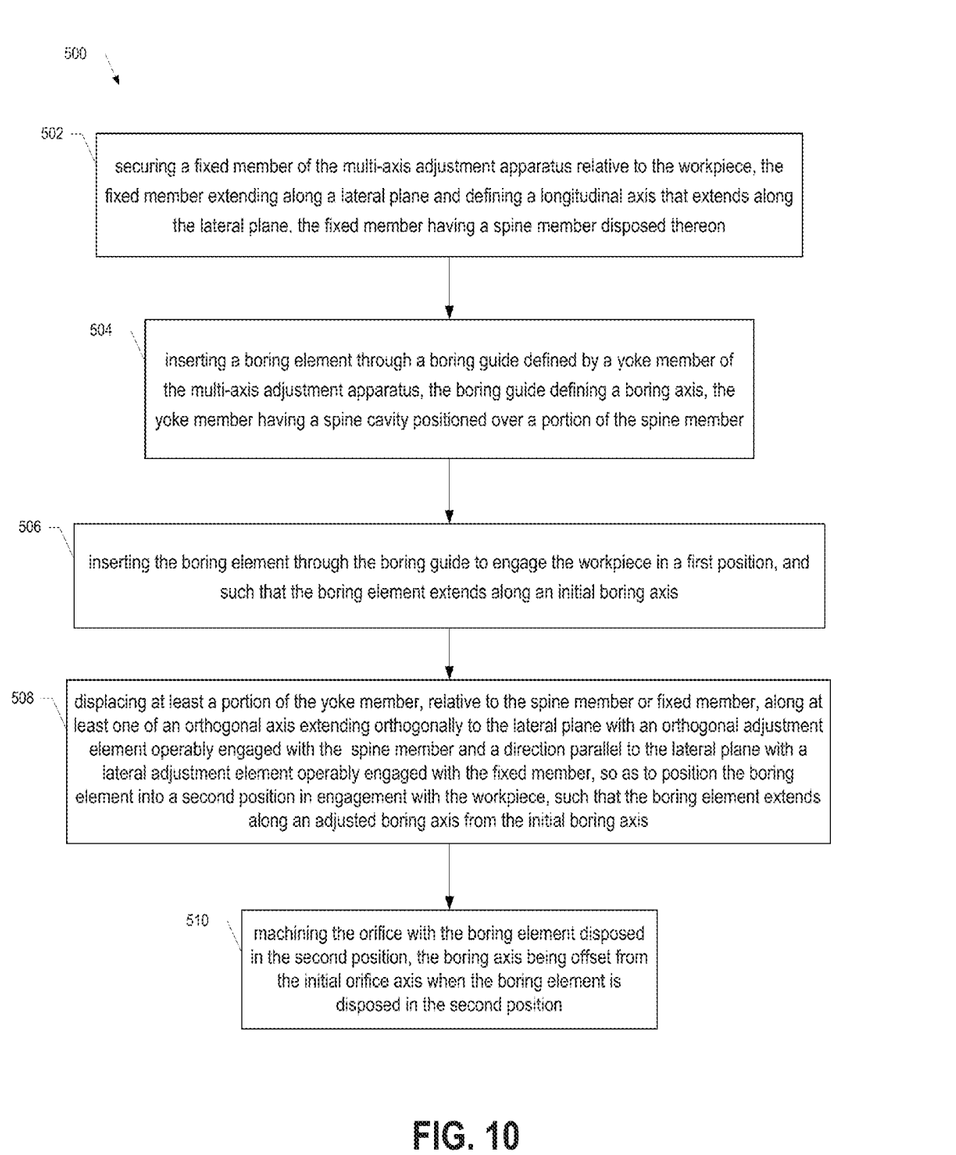
FIG. 10 is a flowchart illustrating various steps in a method according to example implementations.

Additionally, implementations of the present disclosure may further provide a method for machining an orifice in a workpiece 110 with a multi-axis adjustment apparatus 5, as previously described herein. In particular, FIG. 10 illustrates a schematic block diagram of a method 500 for machining an orifice in a workpiece 110 with a multi-axis adjustment apparatus 5.

In particular, the method 500 may begin with securing a fixed member 30 of the multi-axis adjustment apparatus relative to the workpiece 110 (Block 502). The method 500 may include attaching a fixed member 30 that extends along a lateral plane and defines a longitudinal axis X that extends along the lateral plane. Additionally, the fixed member 30 may be operably engaged with a spine member 20 disposed thereon.

The method 500 may further include inserting a boring element 70 through a boring guide 11 (Block 504). In particular, the method 500 may include inserting a boring element 70 through the boring guide 11 defined by the yoke member 10. In some aspects, the boring element 70 may be inserted through a plurality of boring guides 11 defined by the yoke member 10. Further, the boring guide 11 may define the boring axis B, and the yoke member 10 may further include a spine cavity 12 that is positioned over a portion of the spine member 20.

According to some aspects, the method 500 may further include inserting the boring element 70 through the orifice in the workpiece 110 to a first position (Block 506). As previously mentioned, the first position may be defined as the position of the multi-axis adjustment apparatus 5 when the orthogonal center pin 85 is operably engaged with the orthogonal center pin channel 24 such that the orthogonal center pin 85 is disposed equidistant from the ends of the orthogonal center pin channel 24, which extends along a direction parallel to the lateral axis Y. Further, the first position may be defined as when the boring axis B extends along a direction parallel to the longitudinal axis X and parallel to the lateral plane defined by the fixed member 30. In some aspects, the orifice(s) may define an initial orifice axis that is parallel to the boring axis B when the boring element 70 of the multi-axis adjustment apparatus 5 is disposed in the first position.

The method 500 may further include displacing at least a portion of the yoke member, relative to the spine member or fixed member, along at least one of an orthogonal axis Z extending orthogonally to the lateral plane with an orthogonal adjustment element operably engaged with the spine member and/or a direction parallel to the lateral plane with a lateral adjustment element operably engaged with the fixed member so as to position the boring element 70 into a second position (Block 508). In particular, positioning the boring element 70 of the multi-axis adjustment apparatus 5 to a second position may include displacing at least a portion of the yoke member 10, relative to the fixed member, along a direction parallel to the orthogonal axis Z, which extends along a direction orthogonally from the lateral plane, with an orthogonal adjustment element 40, as previously described herein.

In some aspects, the method may include displacing at least a portion of the yoke member 10, relative to the spine member 20 and the fixed member 30, with an orthogonal adjustment element 40 configured to cooperate with the spine member 20 to displace the portion of the yoke member 10. Additionally or alternatively, the orthogonal adjustment element 40 may be operably engaged between the spine member 20 and the yoke member 10. In some aspects, the orthogonal adjustment element 40 may be configured to displace at least a portion of the yoke member 10, relative to the spine member 20 and the fixed member 40, by increasing or decreasing the pitch of a portion of the yoke member 10 relative to the spine member 20 and the fixed member 30. In particular, the orthogonal adjustment element 40 may be configured to pitch the portion of the yoke member 10 about the lateral center pin 80. In particular, the spine member 20 may be partially disposed in a spine cavity 12 defined by the yoke member 10. Further, the yoke member 10 may define a lateral center pin orifice 14 that extends parallel to the lateral plane, and the spine member 20 may define a lateral center pin slot 23 that extends through the spine member 20. The lateral center pin 80 may operably engage the lateral center pin orifice 14 of the yoke member 10 and the lateral center pin slot 23 of the spine member 20 to prevent the yoke member 10 from being displaced relative to the spine member 20 along a direction parallel to the longitudinal axis X.

Additionally or alternatively, positioning the boring element 70 of the multi-axis adjustment apparatus 5 to a second position may include displacing a portion of the yoke member 10, relative to the fixed member, along a direction parallel to the lateral plane with a lateral adjustment element 50, as previously described herein. In some aspects, the lateral adjustment element 50 may be operably engaged with the fixed member 30. Additionally, the method may include displacing at least a portion of the spine member 20 and the yoke member 10, relative to the fixed member 30, along a direction parallel to the lateral plane with a lateral adjustment element 50 that is operably engaged between the fixed member 30 and the spine member 20. Further, the method may include displacing at least a portion of the spine member 20 and the yoke member 10, relative to the fixed member 30, along a direction parallel to the lateral plane with a lateral adjustment element 50 configured to rotate the yoke member 10, via the spine member 20, about the orthogonal axis Z. In particular, the lateral adjustment element 50 may be configured to rotate the spine member 20 and the yoke member 10 about an orthogonal center pin 85 disposed in an orthogonal center pin orifice 31 of the fixed member 30 that extends along a direction parallel to the orthogonal axis Z. In some aspects, the orthogonal center pin 85 may be partially disposed in an orthogonal center pin channel 24 defined by the spine member 20. Additionally, when the orthogonal center pin 85 operably engages and extends through the orthogonal center pin orifice 31 of the fixed member 30 and operably engages and is partially disposed within the orthogonal center pin channel 24 of the spine member 20, the orthogonal center pin 85 prevents the spine member 20 from being displaced, relative to the fixed member 30, along a direction parallel to the longitudinal axis X.

The method 500 may further include machining the orifice of the workpiece 110 with the boring element 70 disposed in the second position (Block 510). When the boring element 70 of the multi-axis adjustment apparatus 5 is disposed in the second position, the boring axis B may be offset from the initial orifice axis.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A multi-axis adjustment apparatus configured to machine a workpiece, the apparatus comprising:
   a yoke member defining a boring guide, the boring guide defining a boring axis and being adapted to receive a boring element for machining the workpiece, the yoke member further including a spine cavity extending along the yoke member parallel to the boring axis;
   a spine member partially disposed within the spine cavity of the yoke member;
   a fixed member disposed under the spine member and extending along a lateral plane, the fixed member defining a longitudinal axis that extends parallel to the lateral plane;
   an orthogonal adjustment element operably engaged with the spine member, and configured to cooperate with the spine member to displace at least a portion of the yoke member, relative to the spine member or the fixed member, along an orthogonal axis extending orthogonally from the lateral plane; and
   a lateral adjustment element operably engaged with the fixed member, and configured to cooperate with the fixed member to displace at least a portion of the spine member, relative to the fixed member, along a direction parallel to the lateral plane.

2. The apparatus of claim 1 further comprising a spine member biasing element configured to bias the spine member towards a spine cavity wall of the yoke member, the spine cavity wall defining, in part, the spine cavity.

3. The apparatus of claim 1 further comprising a fixed member biasing element configured to bias the spine member towards or against the fixed member.

4. The apparatus of claim 1, wherein the yoke member defines a lateral center pin orifice extending laterally across the yoke member and into the spine cavity, wherein the spine member defines a lateral center pin slot extending laterally across the spine member, and wherein the apparatus comprises a lateral center pin configured to be operably engaged between the lateral center pin orifice and the lateral center pin slot to prevent the yoke member from being displaced relative to the spine member along a direction parallel to the longitudinal axis.

5. The apparatus of claim 1 wherein the fixed member defines an orthogonal center pin orifice extending parallel to the orthogonal axis, wherein the spine member defines an orthogonal center pin channel extending parallel to the orthogonal axis, and wherein the apparatus comprises an orthogonal center pin configured to be operably engaged between the orthogonal center pin orifice and the orthogonal center pin channel to prevent the spine member from being displaced relative to the fixed member along a direction parallel to the longitudinal axis.

6. The apparatus of claim 1, wherein the orthogonal adjustment element is further configured to pitch a portion of the yoke member relative to the spine member and fixed member.

7. The apparatus of claim 1, wherein the lateral adjustment element is further configured to rotate the spine member, and the yoke member engaged therewith, about the orthogonal center pin relative to the fixed member.

8. The apparatus of claim 1 further comprising an attachment element configured to secure the boring guide relative to the workpiece.

9. The apparatus of claim 1 further comprising an alignment arrangement operably engaged with the boring guide, the alignment arrangement being configured to determine an orientation of the boring axis relative to the fixed member.

10. A method for machining an orifice in a workpiece with a multi-axis adjustment apparatus, the method comprising:
   securing a fixed member of the multi-axis adjustment apparatus relative to the workpiece, the fixed member extending along a lateral plane and defining a longitudinal axis that extends along the lateral plane, the fixed member having a spine member disposed thereon;
   inserting a boring element through a boring guide defined by a yoke member of the multi-axis adjustment apparatus, the boring guide defining a boring axis, the yoke member having a yoke cavity positioned over a portion of the spine member;
   inserting the boring element through the boring guide to engage the workpiece in a first position, and such that the boring element extends along an initial boring axis;
   displacing at least a portion of the yoke member, relative to the spine member or fixed member, along at least one of an orthogonal axis extending orthogonally to the lateral plane with an orthogonal adjustment element operably engaged with the spine member;
   displacing at least a portion of the spine member along a direction parallel to the lateral plane with a lateral adjustment element operably engaged with the fixed member, so as to position the boring element into a second position in engagement with the workpiece, such that the boring element extends along an adjusted boring axis displaced from the initial boring axis; and
   machining the orifice with the boring element disposed in the second position, the boring axis being offset from the initial orifice axis when the boring element is disposed in the second position.

11. The method of claim 10, wherein displacing at least a portion of the yoke member further comprises displacing at least a portion of the yoke member, relative to the spine member or the fixed member, with an orthogonal adjustment element operably engaged between the spine member and the yoke member.

12. The method of claim 11, wherein displacing at least a portion of the yoke member further comprises displacing at least a portion of the yoke member, relative to the spine member or the fixed member, with an orthogonal adjustment element configured to pitch the portion of the yoke member relative to the spine member or the fixed member.

13. The method of claim 12, wherein the yoke member defines a lateral center pin orifice extending laterally across the yoke member and into the spine cavity, wherein the spine member defines a lateral center pin slot extending laterally across the spine member, wherein the apparatus comprises a lateral center pin configured to be operably engaged between the lateral center pin orifice and the lateral center pin slot to prevent the yoke member from being displaced relative to the spine member along a direction parallel to the longitudinal axis, and wherein displacing at least a portion of the yoke member further comprises displacing at least a portion of the yoke member, relative to the fixed member, with an orthogonal adjustment element configured to pitch the portion of the yoke member about the lateral center pin.

14. The method of claim 10, wherein displacing at least a portion of the yoke member further comprises displacing at least a portion of the spine member and the yoke member engaged therewith, relative to the fixed member, with a lateral adjustment element operably engaged between the fixed member and the spine member.

15. The method of claim 14, wherein displacing at least a portion of the yoke member further comprises displacing at least a portion of the spine member, and the yoke member engaged therewith, relative to the fixed member, with a lateral adjustment element configured to rotate the spine member and yoke member about the orthogonal axis.

16. The method of claim 15, wherein the fixed member defines an orthogonal center pin orifice extending parallel to the orthogonal axis, wherein the spine member defines an orthogonal center pin channel extending parallel to the orthogonal axis, and wherein the apparatus comprises an orthogonal center pin configured to be operably engaged between the orthogonal center pin orifice and the orthogonal center pin channel to prevent the spine member from being displaced relative to the fixed member along a direction parallel to the longitudinal axis, and wherein displacing at least a portion of the yoke member further comprises displacing at least a portion of the spine member, and the yoke member engaged therewith, relative to the fixed member, with a lateral adjustment element configured to rotate the spine member, and the yoke member engaged therewith, about the orthogonal center pin.

17. A tool configured to create an orifice in a workpiece, the tool comprising:
   a multi-axis adjustment apparatus comprising:
      a yoke member defining a boring guide, the boring guide defining a boring axis and being adapted to receive a boring element for machining the workpiece, the yoke member further including a spine cavity extending along the yoke member parallel to the boring axis;
      a spine member partially disposed within the spine cavity of the yoke member;
      a fixed member disposed under the spine member and extending along a lateral plane, the fixed member defining a longitudinal axis that extends parallel to the lateral plane;
      an orthogonal adjustment element operably engaged with the spine member, and configured to cooperate with the spine member to displace at least a portion of the yoke member, relative to the spine member and fixed member, along an orthogonal axis extending orthogonally from the lateral plane;
      a lateral adjustment element operably engaged with the fixed member, and configured to cooperate with the fixed member to displace at least a portion of the spine member and at least a portion of the yoke member, relative to the fixed member, along a direction parallel to the lateral plane;

an attachment element configured to secure the boring guide relative to the workpiece; and a drive element operably engaged with the boring element, and configured to rotate the boring element, within the boring guide, about the boring axis.

18. The tool of claim 17, wherein the orthogonal adjustment element is further configured to pitch a portion of the yoke member relative to the spine member and fixed member.

19. The tool of claim 17, wherein the lateral adjustment element is further configured to rotate the spine member and yoke member relative to the fixed member about the orthogonal axis.

* * * * *